United States Patent
Dhanekula et al.

(10) Patent No.: US 8,150,655 B2
(45) Date of Patent: Apr. 3, 2012

(54) CHARACTERIZING A COMPUTER SYSTEM USING A PATTERN-RECOGNITION MODEL

(75) Inventors: Ramakrishna C. Dhanekula, San Diego, CA (US); Keith A. Whisnant, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 797 days.

(21) Appl. No.: 12/240,211

(22) Filed: Sep. 29, 2008

(65) Prior Publication Data
US 2010/0082299 A1    Apr. 1, 2010

(51) Int. Cl.
*G06F 11/30* (2006.01)
(52) U.S. Cl. .................................... 702/186
(58) Field of Classification Search ........... 702/186
See application file for complete search history.

(56) References Cited

U.S. PATENT DOCUMENTS 7,725,285 B2 *   5/2010   Dhanekula et al. ........... 702/130

* cited by examiner

*Primary Examiner* — Drew A Dunn
*Assistant Examiner* — Stephen Cherry
(74) *Attorney, Agent, or Firm* — Parker, Vaughan, Fleming & Dowler LLP (57) ABSTRACT

Some embodiments of the present invention provide a system that characterizes a computer system using a pattern-recognition model. First, values for an environmental parameter are monitored from a set of sensors associated with the computer system. Then, a baseline for the environmental parameter is calculated based on the monitored values from a subset of the set of sensors. Next, the baseline is subtracted from the monitored values from sensors in the set of sensors to produce compensated values. Then, the compensated values are used as inputs to the pattern-recognition model, which produces estimates for the compensated values based on correlations between the compensated values learned during a training phase. Next, residuals are calculated by subtracting the estimates for the compensated values from the compensated values. Then, the residuals are analyzed to characterize the computer system.

20 Claims, 5 Drawing Sheets

CHARACTERIZING A COMPUTER SYSTEM USING A PATTERN-RECOGNITION MODEL

BACKGROUND

1. Field

The present invention generally relates to techniques for characterizing a computer system. More specifically, the present invention relates to a method and an apparatus that characterizes a computer system using a pattern-recognition model.

2. Related Art

Many computer systems include hardware and software sensors to monitor computer system performance parameters which are analyzed to aid in fault-monitoring. Pattern-recognition methods are frequently used in such fault-monitoring analyses in which the behavior of the performance parameters is modeled using correlations learned during a training phase. Then, during operation of the computer system, the model generates estimates of the performance parameters that can be used for fault monitoring. However, if the ambient temperature during the operation of the computer system changes from the ambient temperature during the training phase, the pattern-recognition model may incorrectly generate alarms based on temperature sensor readings which, though affected by the change in the ambient temperature, are actually working properly. In order to minimize this possibility, pattern-recognition models may be trained over long periods of time to try to cover all variations in the ambient temperature that may be experienced during operation of the computer system. However, this can extend the training process, potentially introducing errors into the model if computer components degrade during the training process, and it may not necessarily even solve the problem.

Hence, what is needed is a method and system that characterizes a computer system using a pattern-recognition model without the above-described problems.

SUMMARY

Some embodiments of the present invention provide a system that characterizes a computer system using a pattern-recognition model. First, values for an environmental parameter are monitored from a set of sensors associated with the computer system. Then, a baseline for the environmental parameter is calculated based on the monitored values from a subset of the set of sensors. Next, the baseline is subtracted from the monitored values from sensors in the set of sensors to produce compensated values. Then, the compensated values are used as inputs to the pattern-recognition model, which produces estimates for the compensated values based on correlations between the compensated values learned during a training phase. Next, residuals are calculated by subtracting the estimates for the compensated values from the compensated values. Then, the residuals are analyzed to characterize the computer system.

In some embodiments, the pattern-recognition model uses a non-linear, non-parametric pattern-recognition technique.

In some embodiments, the pattern-recognition model uses a multivariate state estimation technique (MSET).

In some embodiments, the environmental parameter includes at least one of: a temperature, a humidity, a vibration amplitude, and an electromagnetic signal.

In some embodiments, the baseline is an average of values from sensors in the set of sensors.

In some embodiments, the average is calculated from values contemporaneously obtained from sensors in the set of sensors.

In some embodiments, the training phase includes selecting the subset of sensors used for calculating the baseline.

In some embodiments, subtracting the baseline from the monitored values from sensors in the set of sensors includes subtracting the baseline from monitored values from sensors in the set of sensors which are different from sensors in the subset of sensors used to calculate the baseline.

In some embodiments, analyzing the residuals to characterize the computer system includes generating an alarm based on a sequential hypothesis test of the residuals.

In some embodiments, analyzing the residuals to characterize the computer system includes generating an alarm based on a sequential probability ratio test (SPRT) of the residuals.

In some embodiments, at least one sensor in the set of sensors associated with the computer system is located in a separate computer system.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
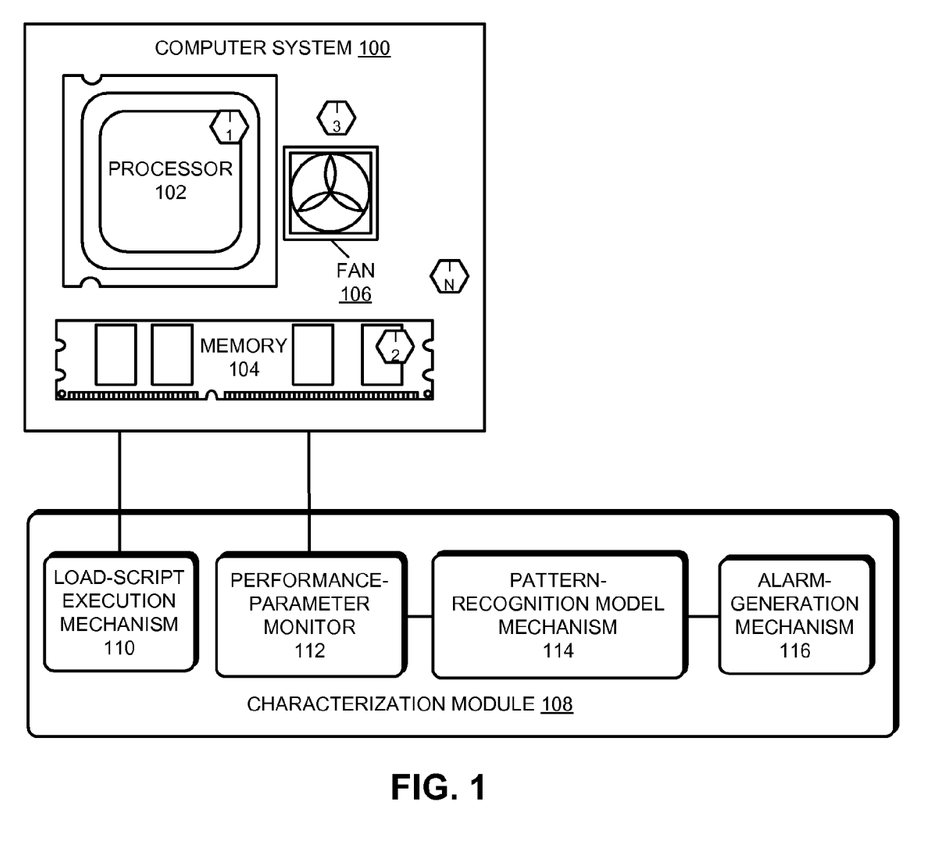
FIG. 1 illustrates a system that characterizes a computer system using a pattern-recognition model in accordance with some embodiments of the present invention.

FIG. 1 illustrates a system that characterizes a computer system using a pattern-recognition model in accordance with some embodiments of the present invention. Computer system 100 includes: processor 102, memory 104, fan 106, and N temperature sensors with only temperature sensors T1, T2, T3, and TN depicted. Furthermore, characterization module 108 includes load-script execution mechanism 110, performance-parameter monitor 112, pattern-recognition model mechanism 114, and alarm-generation mechanism 116.

Computer system 100 can include but is not limited to a server, a server blade, a datacenter server, an enterprise computer, a field-replaceable unit that includes a processor, or any other computation system that includes one or more processors, and one or more cores in each processor.

Processor 102 can generally include any type of processor, including, but not limited to, a microprocessor, a mainframe computer, a digital signal processor, a personal organizer, a device controller, a computational engine within an appliance, and any other processor now known or later developed. Furthermore, processor 102 can include one or more cores.

Memory 104 can include any type of memory, including but not limited to, dynamic random access memory (DRAM), static random access memory (SRAM), and any other type of memory now known or later developed.

Fan 106 cools processor 102 and memory 104, and can be implemented in any technology now known or later developed. In some embodiments, fan 106 also cools other devices in computer system 100 including but not limited to any other chip or integrated circuit in computer system 100. In some embodiments, fan 106 is replaced by multiple fans to draw ambient air into computer system 100, cool one or more processors, memory chips, and/or other integrated circuits in computer system 100.

The N temperature sensors in computer system 100 can include any type of temperature sensitive sensor including but not limited to a discrete temperature sensing device, or a temperature sensing device integrated into a computer system component such as processor 102. The N temperature sensors may be mechanical, electrical, optical, or any combination thereof, and may be implemented in any technology now known or later developed. In some embodiments, the N temperature sensors are coupled to one or more data buses in computer system 100 to enable communication of the sensed temperature data within and out of computer system 100.

Load-script execution mechanism 110 is any mechanism that can implement a load script on computer system 100 and can be implemented in any combination of hardware and software. In some embodiments, load-script execution mechanism 110 runs on computer system 100, while in other embodiments, load-script execution mechanism 110 runs on a separate computer system. In some embodiments, the load script run by load-script execution mechanism 110 generates one or more of: a predetermined load profile on processor 102, a predetermined input-output pattern, and a predetermined memory and disk drive usage pattern.

Performance-parameter monitor 112 can be any device that can monitor performance parameters of computer system 100, including but not limited to: temperature information from one or more of the N temperature sensors including T1, T2, T3, and TN; other environmental variables (such as relative humidity; cumulative or differential vibrations within the computer system 100; electromagnetic signals; acoustic signals; current noise; voltage noise; and/or time-domain reflectometry readings); energy consumption; currents; voltages; fan speeds; performance metrics; throughput variables; transaction latencies; queue lengths; loads on processor 102 or one or more other processors or processor cores; loads on memory 104; loads on a cache; I/O traffic; bus saturation metrics; FIFO overflow statistics; various operational profiles gathered through 'virtual sensors' located within an operating system in computer system 100; telemetry signals associated with canary performance parameters for synthetic user transactions which are periodically generated for the purpose of measuring quality of service from the end user's perspective; and time series of any performance parameter. Performance parameters can also include but are not limited to performance parameters as set forth in U.S. Pat. No. 7,020,802, entitled "Method and Apparatus for Monitoring and Recording Computer System Performance Parameters," by Kenny C. Gross and Larry G. Votta, Jr., issued on 28 Mar. 2006, which is hereby fully incorporated by reference.

Performance-parameter monitor 112 can be implemented in any combination of hardware and software. In some embodiments, performance-parameter monitor 112 operates on computer system 100. In other embodiments, performance-parameter monitor 112 operates on one or more service processors. In still other embodiments, performance-parameter monitor 112 is located inside of computer system 100. In yet other embodiments, performance-parameter monitor 112 operates on a separate computer system. In some embodiments, performance-parameter monitor 112 includes a method and/or apparatus for monitoring and recording computer system performance parameters as set forth in U.S. Pat. No. 7,020,802.

Pattern-recognition model mechanism 114 can be any device that can receive input from performance-parameter monitor 112 and generate an estimate of one or more model outputs in accordance with embodiments of the present invention. Note that pattern-recognition model mechanism 114 can implement any pattern-recognition model, including but not limited to a nonlinear, non-parametric regression such as a multivariate state estimation technique (MSET). Furthermore, pattern-recognition model mechanism 114 can be implemented in any combination of hardware and software. In some embodiments, pattern-recognition model mechanism 114 operates on computer system 100. In other embodiments, pattern-recognition model mechanism 114 operates on one or more service processors. In still other embodiments, pattern-recognition model mechanism 114 is located inside computer system 100. In yet other embodiments, pattern-recognition model mechanism 114 operates on a separate computer system.

Note that the term MSET as used in this specification refers to a class of pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington D.C., Nov. 13-17, 2000. This paper outlines several different pattern-recognition approaches. Hence, the term MSET as used in this specification can refer to (among other things) any technique outlined in [Gribok], including: ordinary least squares (OLS), support vector machines (SVM), artificial neural networks (ANNs), MSET, or regularized MSET (RMSET).

Alarm-generation mechanism 116 can be any device that can receive input from pattern-recognition model mechanism 114 and generate an alarm in accordance with embodiments of the present invention. In some embodiments, alarm-generation mechanism 116 generates alarms based an analysis of the output from pattern-recognition model mechanism 114 using one or more of the following: a sequential hypothesis test such as a sequential probability ratio test (SPRT), or any other test to characterize computer system 100 based on the output from pattern-recognition model mechanism 114. Note that alarm-generation mechanism 116 can be implemented in any combination of hardware and software. In some embodiments, alarm-generation mechanism 116 operates on computer system 100. In other embodiments, alarm-generation mechanism 116 operates on one or more service processors. In still other embodiments, alarm-generation mechanism 116 is located inside computer system 100. In yet other embodiments, alarm-generation mechanism 116 operates on a separate computer system.

Some embodiments of the present invention operate as follows: During operation of computer system 100, load-script execution mechanism 110 causes a load script to run on computer system 100. While the load script is running on computer system 100, performance-parameter monitor 112 monitors performance parameters of computer system 100. Note that the monitored performance parameters include information related to one or more temperatures sensed by the N temperature sensors T1 through TN in computer system 100. In some embodiments, load-script execution mechanism 110 is not present, and a load script is not run on computer system 100 while the performance parameters are monitored.

Pattern-recognition model mechanism 114 then generates a baseline based on the temperatures sensed by the N temperature sensors. In some embodiments, the baseline is generated based on temperatures from a subset of the N temperature sensors determined during a training phase for the pattern-recognition model that is implemented in pattern-recognition model mechanism 114. In some embodiments, the selected subset of temperature sensors used to generate the baseline does not include any sensors used as inputs for the model implemented by pattern-recognition model mechanism 114. For example, if the pattern-recognition model implemented by pattern-recognition model mechanism 114 uses as inputs the temperatures sensed by temperature sensors T1, T2, and T3 along with other performance parameters monitored by performance-parameter monitor 112, then the baseline is generated by pattern-recognition model mechanism 114 using temperatures sensed by temperature sensors T4 through TN. Note that there is no significance to the order or numbering of the temperature sensors. They have been positioned in computer system 100 for exemplary purposes only. In some embodiments, the number and placement of temperature sensors in a computer system can be for any reason, including but not limited to aiding the performance of a pattern-recognition model in accordance with embodiments of the present invention. In some embodiments, temperatures sensed from outside computer system 100 are additionally used to generate the baseline. In the above example, the baseline is generated using temperatures from temperature sensors in other computer systems in addition to temperatures from temperature sensors T4 through TN.

In some embodiments, the baseline is generated by determining the instantaneous average of all of the temperature sensors used to generate the baseline. In the example above, the baseline is determined by calculating the instantaneous average temperatures sensed by temperature sensors T4 through TN. Then, the baseline is subtracted from the temperatures sensed by temperature sensors T1, T2, and T3 and resulting temperature from each of sensors T1, T2, and T3, after the baseline subtraction, is entered into the model along with the other performance parameters used as inputs for the model.

In some embodiments, pattern-recognition model mechanism 114 generates an estimate of the one or more modeled parameters of computer system 100 being characterized by characterization module 108. The pattern-recognition model implemented in pattern-recognition model mechanism 114 is trained to generate these estimates based on correlations between the input performance parameters learned during a training phase. The training phase will be discussed in more detail below.

In some embodiments, the one or more estimates generated by the pattern-recognition model are then used to calculate a residual based on the actual values of the one or more parameters monitored by performance-parameter monitor 112. In some embodiments, the one or more residuals are used for prognostication including, for example, proactive fault monitoring for computer system 100. In some embodiments, a sequential hypothesis test such as SPRT is applied to the residuals. The alarms generated by the sequential hypothesis test are then used in proactive fault monitoring of computer system 100. For example, based on the properties of the generated alarms, including but not limited to the number of alarms and/or the rate of alarms, appropriate service is scheduled for computer system 100.

In some cases, alarm-generation mechanism 116 alters an operation mode of computer system 100. For example, in some embodiments, the alarms generated by alarm-generation mechanism 116 indicate that a computer component such as a power supply is showing signs of weakening or failing. In response to this, alarm-generation mechanism 116 communicates with computer system 100 to alter the requirements on the computer system component. In the case of a power supply, alarm-generation mechanism 116 may instruct computer system 100 to reduce the power output of the faulty power supply and require the other power supplies in computer system 100 to increase their output to make up the difference.

In some embodiments, the baseline is generated using values from the temperature sensors by calculating the mean over time for each sensor and then averaging the means from each sensor. In some embodiments, other statistical processes are used to generate a baseline from the temperature sensors, including but not limited to using: projected temperatures for the sensors based on a time series of the temperatures sensed by the sensors and/or the respective thermal inertias or time constants of the sensors.

In some embodiments, sensors for other environmental parameters are used to generate a baseline, including but not limited to one or more of the following environmental parameters: humidity, vibration, electromagnetic signal, or any other environmental parameter. For example, in some embodiments in which a humidity baseline is used for a pattern-recognition model, M humidity sensors are located in a computer system and a subset the M humidity sensors is used in the pattern-recognition model. Note that the subset of humidity sensors is selected based on the training of the pattern-recognition model. Furthermore, a baseline is generated using the humidity readings from the subset of sensors and the baseline is subtracted from the humidity readings from the sensors used as input to the pattern-recognition model. In some embodiments, the baseline is generated using a subset of humidity sensors that is the complement of the subset of humidity sensors used as input for the pattern-recognition model. In other word, any humidity sensor that is not used in the pattern-recognition model is used to generate the humidity baseline.

We now turn to the training of the pattern-recognition model. In some embodiments, the pattern-recognition model is trained as follows. A training data set is generated by monitoring the performance parameters of a test computer system running a load script. Note that in some embodiments, the training computer system is the same as or a similar computer system to computer system 100. Then, the pattern-recognition model and the optimal subset of temperature sensors for use in generating the baseline are determined based on a pattern-recognition analysis of the training data set. In some embodiments, the temperature sensors and other performance parameters used for the pattern-recognition model are selected based on correlations among the input signals. Then, the subset of temperature sensors used to generate the baseline is determined based on the temperature sensors not used as inputs for the pattern-recognition model. Then, the pattern-recognition model is trained using the selected performance parameters and temperature sensors with the baseline subtracted from the temperature sensor data before it is input into the model. In some embodiments, training the pattern-recognition model using temperature sensor data with a baseline subtracted allows the training period to be reduced from the training period that would be required without the subtraction of the baseline.

Figure 2:
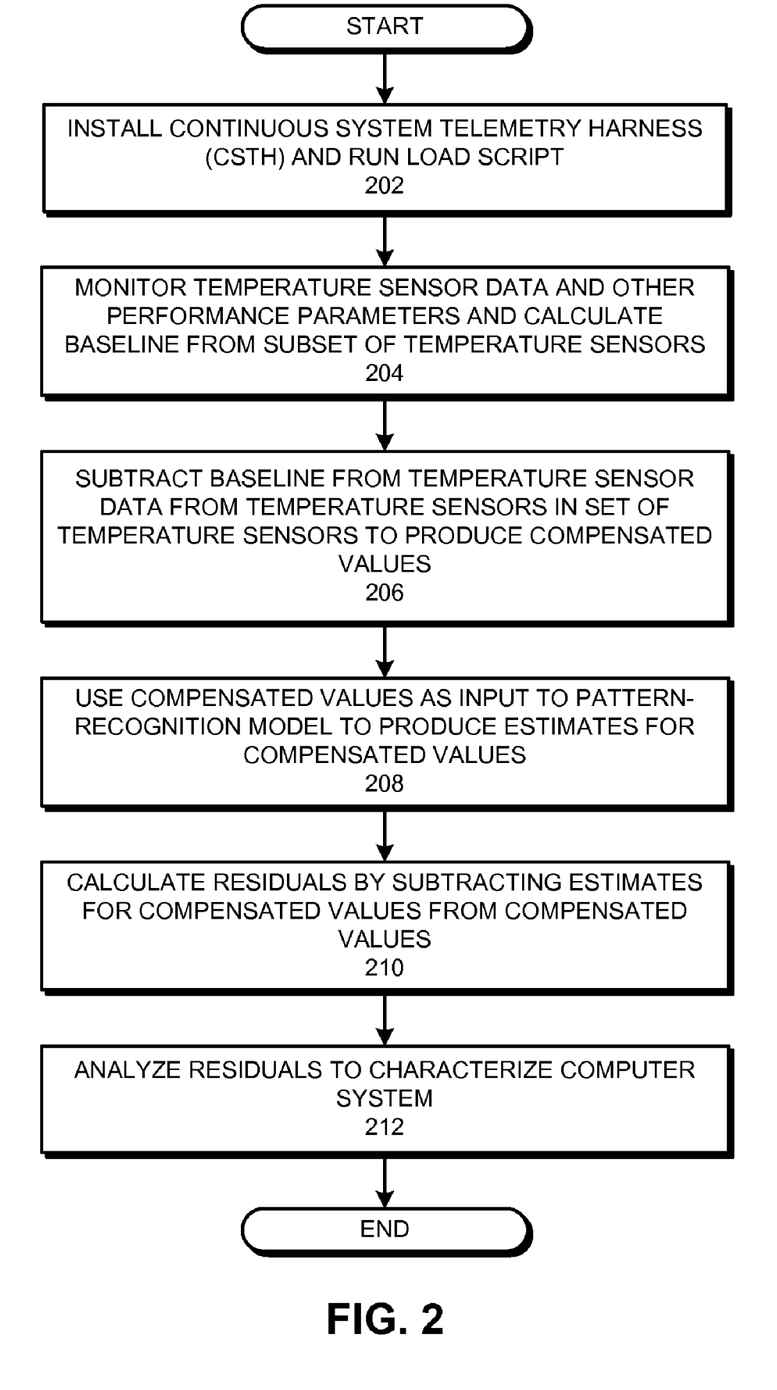
FIG. 2 presents a flowchart illustrating the process of using a pattern-recognition model to characterize a computer system in accordance with some embodiments of the present invention.

FIG. 2 presents a flowchart illustrating the process of using a pattern-recognition model to characterize a computer system in accordance with some embodiments of the present invention. First, a continuous system telemetry harness (CSTH) is installed on the computer system to monitor performance parameters of the computer system (step 202). In some embodiments, the CSTH implements a method and/or apparatus for monitoring and recording computer system performance parameters as set forth in U.S. Pat. No. 7,020,802. Then, a load script is then run on the computer system (step 202). Next, performance parameters of the computer system are monitored, including temperature data, while the load script is running (step 204). Additionally, a baseline is calculated using the temperature data from a subset of temperature sensors selected during a training phase (step 204). Then, the baseline is subtracted from temperature sensor data from temperature sensors in the set of temperature sensors to produce compensated values (step 206). Next, the compensated values are used as input to a pattern-recognition model to produce estimates for the compensated values (step 208). Note that the estimates of the compensated values produced by the pattern-recognition model are based on correlations between the compensated values learned during the training phase discussed below with reference to FIG. 3. Then, residuals are calculated by subtracting the estimates for the compensated values from the compensated values (step 210). Next, the residuals are analyzed to characterize the computer system (step 212). In some embodiments the residuals are analyzed using SPRT to characterize the computer system.

Figure 3:
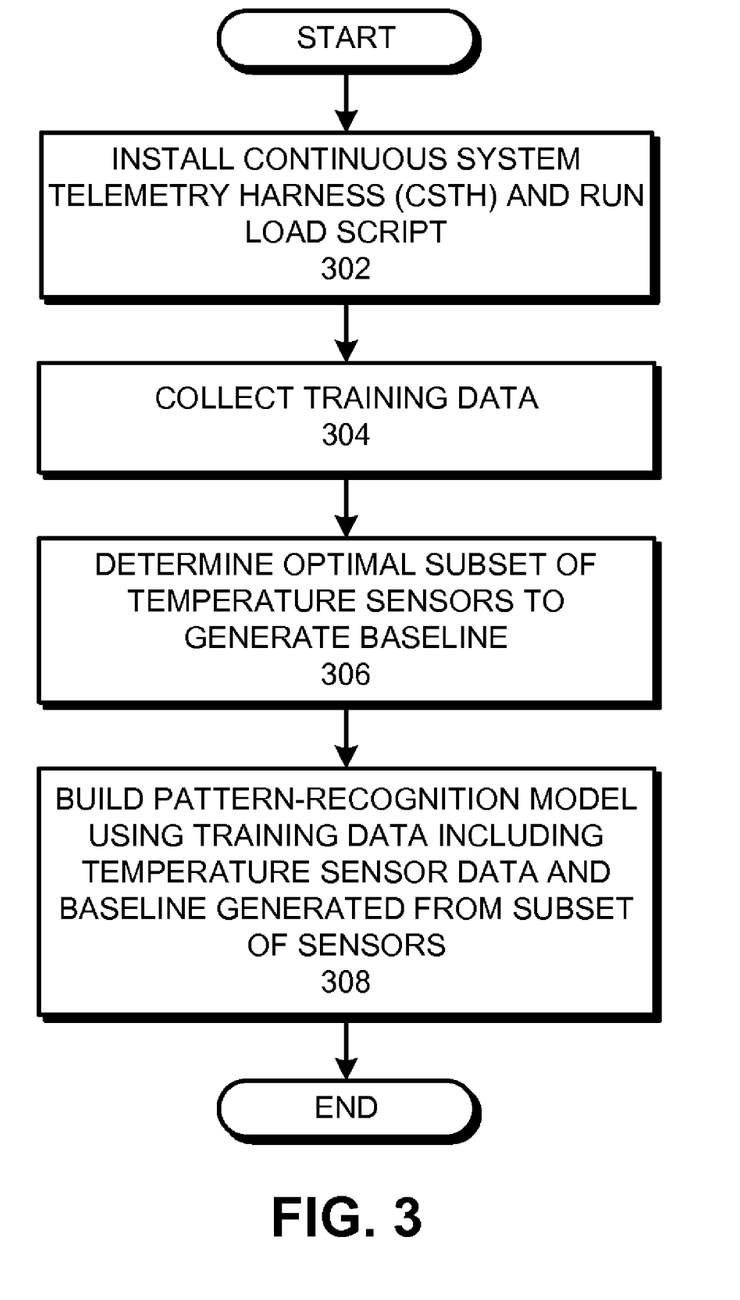
FIG. 3 presents a flowchart illustrating the process of training a pattern-recognition model in accordance with some embodiments of the present invention.

FIG. 3 presents a flowchart illustrating the process of training a pattern-recognition model in accordance with some embodiments of the present invention. First, CSTH is installed on the computer system to monitor the performance parameters of the computer system (step 302). Additionally, a load script is then run on the computer system (step 302). Then, the CSTH monitors performance parameters of the computer system as the load script is running and a training data set is collected (step 304). Next, the optimal subset of temperature sensors is determined for use in generating the baseline (step 306). In some embodiments, the optimal subset of temperature sensors for use in generating the baseline is determined as described above. Then, a pattern-recognition model is built using the monitored performance parameters, including temperature data, where the baseline has been subtracted from the temperature data used to train the model (step 308).

Figure 4:
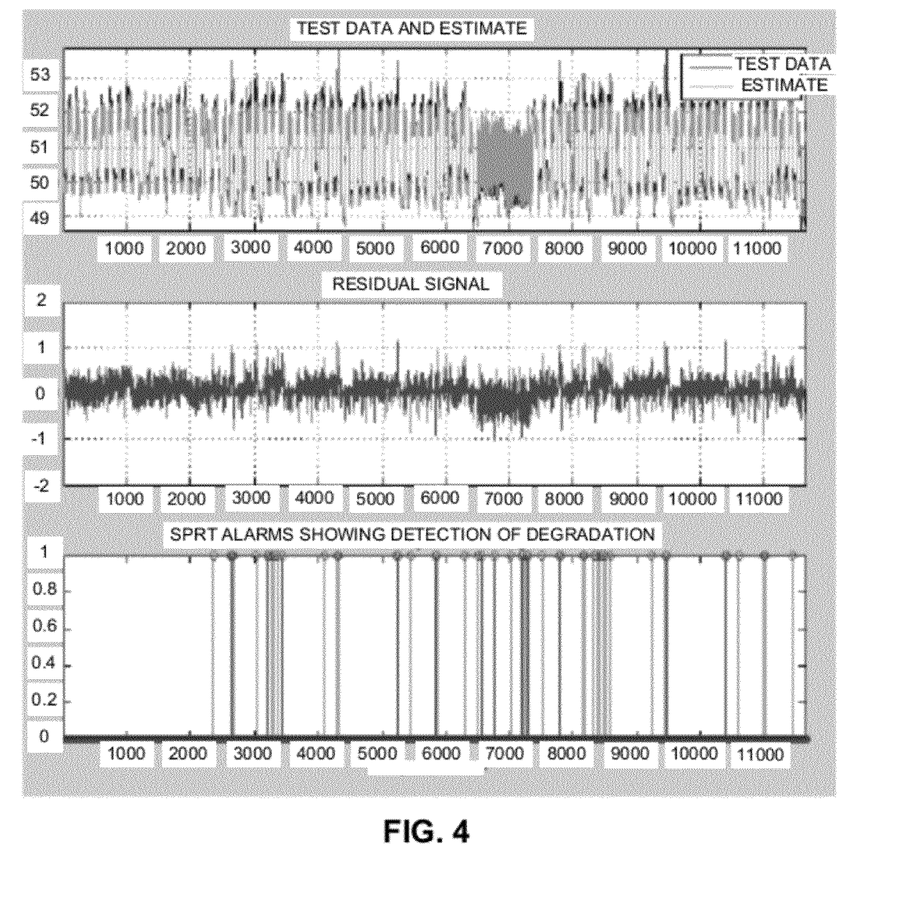
FIG. 4 presents three graphs depicting, respectively, test data from a computer system, and estimates of the data generated using a pattern-recognition model without subtracting a baseline; the residuals generated by the model; and the alarms generated by applying SPRT to the residuals in accordance with an embodiment of the present invention.
Figure 5:
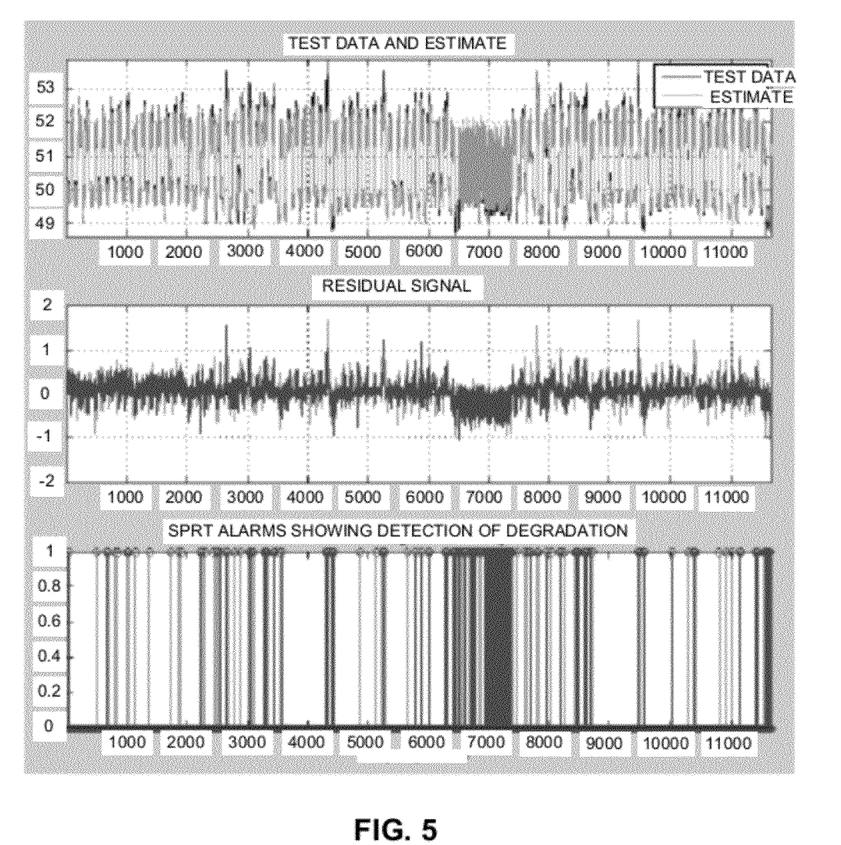
FIG. 5 presents three graphs in which the top graph depicts test data from a computer system, and estimates of the data generated using a pattern-recognition model in which a baseline was subtracting from the model input data in accordance with some embodiments of the present invention. The middle and bottom graphs depict, respectively, the residuals generated by the pattern-recognition model after subtracting the baseline, and the alarms generated by applying SPRT to the residuals in accordance with some embodiments of the present invention.

FIGS. 4 and 5 depict data generated based on a pattern-recognition model constructed to monitor dust build-up on a processor heat sink. In FIG. 4, the pattern-recognition model was constructed without the use of a baseline for the temperature data used in the model, while in FIG. 5 a baseline was used. Note that in both FIGS. 4 and 5, starting at time t=0 minutes, the air flow on the processor heat sink was obstructed in a manner that simulates the build-up of dust.

FIG. 4 presents graphs of depicting test data from a computer system, estimates of the data generated using a pattern-recognition model without subtracting a baseline, the residuals generated by the model and the alarms in accordance with an embodiment of the present invention. The top graph in FIG. 4 depicts the test data monitored from the computer system and the estimate generated using a pattern-recognition model trained without the use of a baseline. The middle graph in FIG. 4 depicts the residual calculated based on the difference between the test data and the estimate generated by the pattern-recognition model. The bottom graph in FIG. 4 depicts a graph of the SPRT alarms generated based on the residual. Note that the first alarm does not appear until about 2300 minutes into the test.

FIG. 5 presents graphs depicting test data from a computer system, estimates of the data generated using a pattern-recognition model in which a baseline was subtracted from the temperature data used in the model, the residuals generated by the model and the alarms in accordance with an embodiment of the present invention. Again, the top graph in FIG. 5 depicts the test data monitored from the computer system and the estimate generated using a pattern-recognition model. However, the estimates in the top graph of FIG. 5 were generated using a baseline. Temperature data from sensors in the computer system were used to generate a baseline which was then subtracted from the temperature data used in the model. The middle graph in FIG. 5 depicts the residual calculated based on the difference between the test data and the estimate generated by the pattern-recognition model. The bottom graph in FIG. 5 depicts a graph of the SPRT alarms generated based on the residual. Note the difference in the alarms generated in the bottom graph of FIG. 5 vs. those generated in the bottom graph of FIG. 4. The alarms generated in FIG. 5 start only 7 minutes into the test, and occur more frequently than those in FIG. 4.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for characterizing a computer system using a pattern-recognition model, the method comprising:
   in one or more computer systems, performing operations for:
      monitoring values for an environmental parameter from a set of sensors associated with the computer system;
      calculating a baseline for the environmental parameter based on the monitored values from a subset of the set of sensors;

subtracting the baseline from the monitored values from sensors in the set of sensors to produce compensated values;

using the compensated values as inputs to the pattern-recognition model, which produces estimates for the compensated values based on correlations between the compensated values learned during a training phase;

calculating residuals by subtracting the estimates for the compensated values from the compensated values; and analyzing the residuals to characterize the computer system.

2. The method of claim 1, wherein the pattern-recognition model uses a non-linear, non-parametric pattern-recognition technique.

3. The method of claim 1, wherein the pattern-recognition model uses a multivariate state estimation technique (MSET).

4. The method of claim 1, wherein the environmental parameter includes at least one of:
 a temperature;
 a humidity;
 a vibration amplitude; and
 an electromagnetic signal.

5. The method of claim 1, wherein the baseline is an average of values from sensors in the set of sensors.

6. The method of claim 5, wherein the average is calculated from values contemporaneously obtained from sensors in the set of sensors.

7. The method of claim 1, wherein the training phase includes selecting the subset of sensors used for calculating the baseline.

8. The method of claim 1, wherein subtracting the baseline from the monitored values from sensors in the set of sensors includes subtracting the baseline from monitored values from sensors in the set of sensors which are different from sensors in the subset of sensors used to calculate the baseline.

9. The method of claim 1, wherein analyzing the residuals to characterize the computer system includes generating an alarm based on a sequential probability ratio test (SPRT) of the residuals.

10. The method of claim 1, wherein at least one sensor in the set of sensors associated with the computer system is located in a separate computer system.

11. A non-transitory computer-readable storage medium storing instructions that when executed by a computer cause the computer to perform a method for characterizing a computer system using a pattern-recognition model, the method comprising:

monitoring values for an environmental parameter from a set of sensors associated with the computer system;

calculating a baseline for the environmental parameter based on the monitored values from a subset of the set of sensors;

subtracting the baseline from the monitored values from sensors in the set of sensors to produce compensated values;

using the compensated values as inputs to the pattern-recognition model, which produces estimates for the compensated values based on correlations between the compensated values learned during a training phase;

calculating residuals by subtracting the estimates for the compensated values from the compensated values; and analyzing the residuals to characterize the computer system.

12. The computer-readable storage medium of claim 11, wherein the pattern-recognition model uses a non-linear, non-parametric pattern-recognition technique.

13. The computer-readable storage medium of claim 11, wherein the pattern-recognition model uses a multivariate state estimation technique (MSET).

14. The computer-readable storage medium of claim 11, wherein the environmental parameter includes at least one of:
 a temperature;
 a humidity;
 a vibration amplitude; and
 an electromagnetic signal.

15. The computer-readable storage medium of claim 11, wherein the baseline is an average of values from sensors in the set of sensors.

16. The computer-readable storage medium of claim 15, wherein the average is calculated from values contemporaneously obtained from sensors in the set of sensors.

17. The computer-readable storage medium of claim 11, wherein the training phase includes selecting the subset of sensors used for calculating the baseline.

18. The computer-readable storage medium of claim 11, wherein subtracting the baseline from the monitored values from sensors in the set of sensors includes subtracting the baseline from monitored values from sensors in the set of sensors which are different from sensors in the subset of sensors used to calculate the baseline.

19. The computer-readable storage medium of claim 11, wherein analyzing the residuals to characterize the computer system includes generating an alarm based on a sequential probability ratio test (SPRT) of the residuals.

20. An apparatus for characterizing a computer system using a pattern-recognition model, the apparatus comprising:

a monitoring mechanism configured to monitor values for an environmental parameter from a set of sensors associated with the computer system;

a calculating mechanism configured to calculate a baseline for the environmental parameter based on the monitored values from a subset of the set of sensors;

a subtracting mechanism configured to subtract the baseline from the monitored values from sensors in the set of sensors to produce compensated values;

a mechanism configured to use the compensated values as inputs to the pattern-recognition model, which produces estimates for the compensated values based on correlations between the compensated values learned during a training phase;

a residual calculating mechanism configured to calculate residuals by subtracting the estimates for the compensated values from the compensated values; and an analyzing mechanism configured to analyze the residuals to characterize the computer system.

* * * * *